July 2, 1946.  F. W. H. MUELLER ET AL  2,403,428
INTENSIFICATION OF THE LATENT IMAGE
Filed Sept. 30, 1942   2 Sheets-Sheet 1
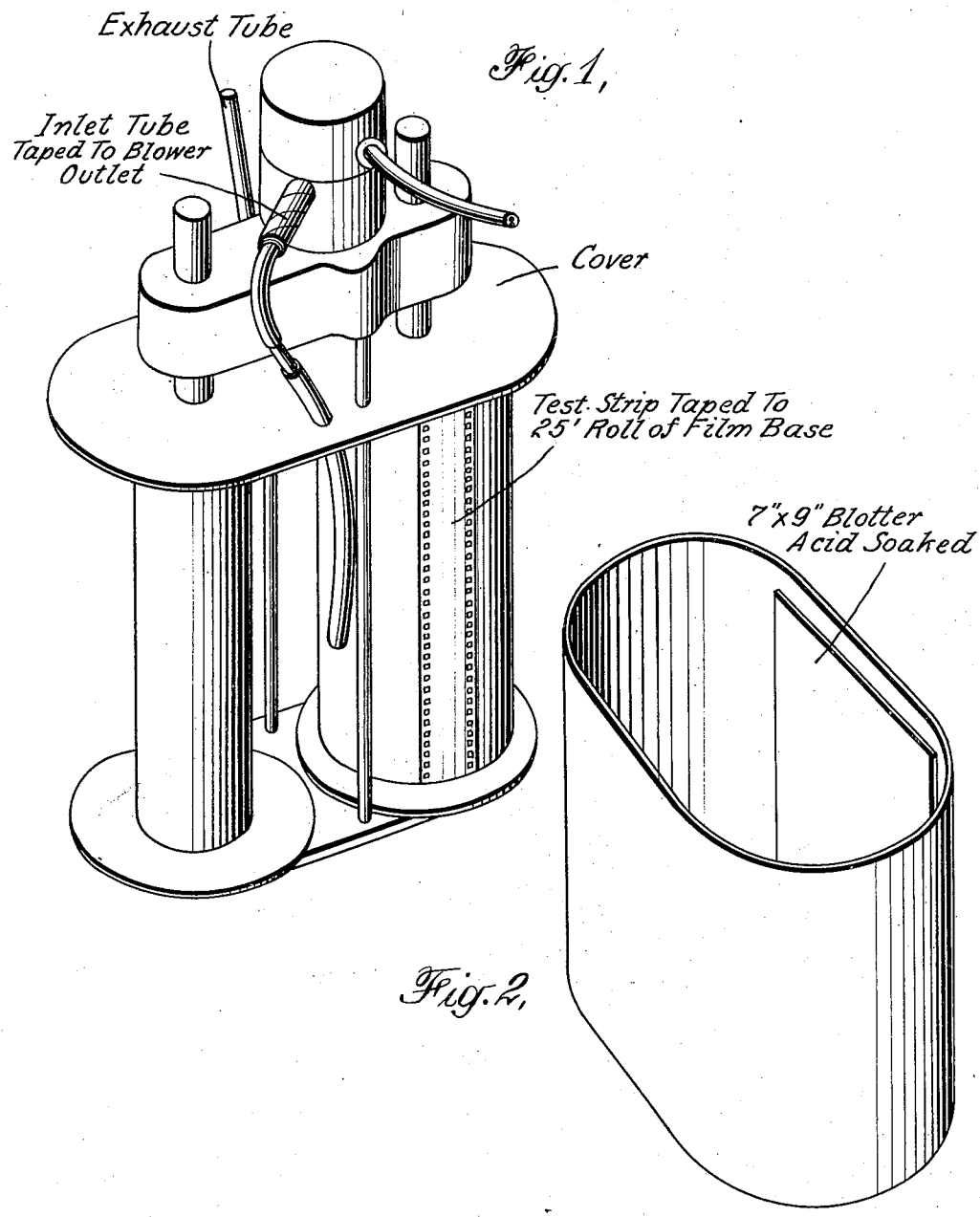
INVENTORS
Fritz W. Hellmut Mueller
James E. Bates
BY
Henry W. Coughlin
ATTORNEY

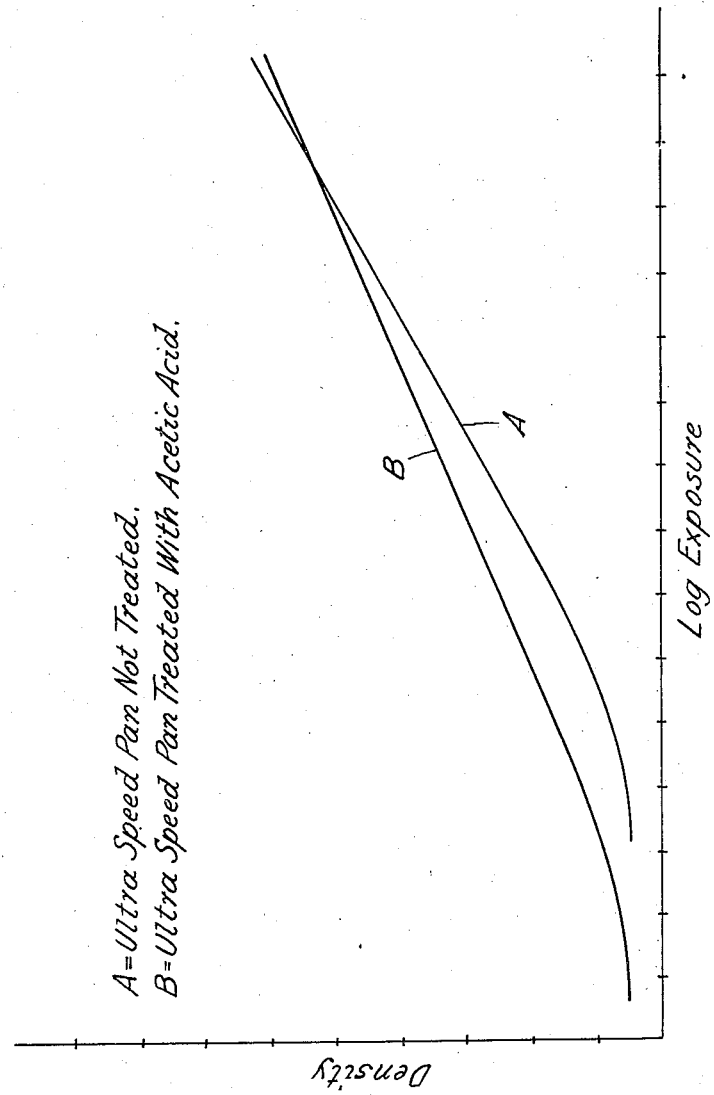

Patented July 2, 1946

2,403,428

UNITED STATES PATENT OFFICE 2,403,428

INTENSIFICATION OF THE LATENT IMAGE

Fritz W. Hellmut Mueller and James E. Bates, Binghamton, N. Y., assignors to General Aniline & Film Corporation, New York, N. Y., a corporation of Delaware Application September 30, 1942, Serial No. 460,196

10 Claims. (Cl. 95—6)

The present invention relates to a new photographic process and more particularly to a method of intensifying or hyper-sensitizing exposed photographic emulsions. The purpose of such intensification is to increase the effective sensitivity of a photographic emulsion or a photographic element.

In the art of photography it is often desirable to increase the effective speed of photographic emulsions as much as possible. This is particularly so when exposure must be made under marginal light conditions. Intensifying the latent image obtained by exposure of a light sensitive silver halide emulsion under marginal light conditions permits the photographer to obtain a fully graduated, shadow-detailed and well defined picture where otherwise the quality of the negative would be poor because of under-exposure. In motion picture photography where very intense illumination is employed, the cost of such illumination can be materially reduced and the working conditions, rendered disagreeable by the amount of illumination required, can be materially improved by the use of a process for intensification of the latent image. The results obtainable by press and aerial night photographers working under conditions where the lighting is limited can also be greatly improved by intensification of the latent image after exposure.

Various methods for intensifying the latent image have been described. In U. S. P. No. 2,168,971, issued August 8, 1939, there is described a method of increasing the speed of photographic emulsions by submitting exposed and undeveloped films to an atmosphere having a relative humidity of about 80% and a temperature of 120° F. for a predetermined length of time. U. S. P. No. 2,201,591, issued May 21, 1940, achieves a similar effect by pre-bathing the exposed and undeveloped film in activating solutions, the activating agents of which are meta substituted amino and hydroxy derivatives of benzene such as resorcinol or meta nitraniline. According to U. S. P. No. 2,146,802, issued February 14, 1939, the effective speed of photographic emulsions before and after exposure may be increased by treatment with mercury vapor. G. S. Moore, in the Photographic Journal, volume 81, pages 27–32 (1941), refers to exposure of the latent image to green light and in U. S. P. No. 2,220,882, issued November 12, 1940, flashing of the latent image with infrared radiation is suggested for the same purpose.

For the most part these prior art processes for intensification of the latent image have the peculiar disadvantage that the increase in effective speed produced by such treatments is rather small when applied to high-speed emulsion films while the greater speed increases are obtained only with the low speed emulsion films. Such known methods are also cumbersome or involve the use of expensive apparatus and unstable chemical compounds or solutions. It is, therefore, an object of the present invention to provide a simple method for treating photographic emulsions whereby the quality and speed of the photographic emulsions and particularly medium and high-speed photographic emulsions are improved to such a degree that the sensitivity of the emulsion is increased far beyond its original value. It is a further object to provide a simple method of obtaining photographic records under extremely limited light conditions which would not produce a sufficiently developable latent image on the high-speed commercially available films to permit of obtaining proper photographic recording under ordinary conditions of development. It is still another object of this invention to provide a method of intensification of the latent image which does not necessitate the use of materials difficult to handle or unstable under ordinary conditions.

In the accomplishment of these and other objects according to this invention, it has been discovered that the latent image produced on a photographic element by exposure can be intensified by treatment of the exposed and undeveloped material with the vapors of organic acids or solutions of organic acids in suitable solvents. This method gives substantial increases in the case of low and medium speed emulsions and yields outstanding results in the case of high-speed emulsions. The effect of the intensification achieved by this method in the case of the highest speed emulsion is to increase the sensitivity by 400% of its original value without producing objectionable fog or any noticeable increase in the grain size of the silver halide. It is, therefore, possible to obtain pictures possessing a definition of detail and brilliance not heretofore obtainable with any known photographic material when making the exposure under extremely poor light conditions and developing the film by known methods. In principle, this process of intensification is carried out as follows:

The exposed and undeveloped film which may be either black and white or color film, hardened or non-hardened, sensitized or unsensitized, is exposed to an atmosphere of organic acids in a vapor state containing at least traces of water vapor or is immersed in a bath consisting of a solution of an organic acid in an alcohol or a non-polar solvent such as benzene or carbon tetrachloride which alcohol or non-polar solvent contains at least traces of water but not more than 1% by volume. By "traces of water" we mean to include amounts of water which are, for instance, as low as two parts of water per million. The treatment is carried out at room temperature or slightly elevated temperatures, preferably not higher tha 85° to 90° F. under normal atmospheric conditions or in vacuo. Increases in the speed of the emulsion of some 50% to 400% have been observed and in contrast to known methods of intensification, the high-speed emulsions show the greatest response to the treatment; that is, a greater increase in the sensitivity of high-speed emulsions is achieved than in the low and medium speed emulsions.

In carrying out the process by treatment of the exposed film with the acid vapors any convenient enclosure, which will confine the vapors and permit of intimate contact of all parts of the emulsion surface of the film with the acid vapors, may be employed. For cut film a wooden cabinet 12" x 21" x 34" has been found suitable. This will hold a number of film strips which can be treated simultaneously. An electric fan should be provided therein to give even circulation of the vapors rising from an open dish of the acid. With such an arrangement the treatment requires from 10 minutes to 1½ hours, depending upon the type and concentration of the acid. While all organic acids which possess a sufficiently high vapor pressure at temperatures which are not detrimental to the photographic materials may be used, it has been found practical in order to cut down the time of the treatment to use lower molecular weight, aliphatic acids and particularly formic acid, acetic acid, propionic acid or isobutyric acid. Mixtures of formic acid and acetic acid have in some instances been found to give more rapid results than acetic acid alone and the selection of a suitable ratio between the formic and acetic acids enables the operator to choose the more convenient length of time for the treatment. A particularly advantageous container for carrying out the vapor treatment is the so-called Smith developing machine modified to allow for acid vaporization and circulation. This device is illustrated in the drawings wherein Figure I is a perspective view of the top and core of the Smith developing machine and Figure II is a perspective view of the can or container for the core of Figure I. The legends on these figures adequately explain the elements which have been added to the regular Smith developing machine to adapt it to this use. When the acid treatment is carried out by bathing the film in, for instance, a benzene solution of the organic acid, the solution should be placed in a tank provided with agitating means to provide for circulation of the acid solution in contact with the film.

The following examples will serve to specifically describe the process as applied to particular types of films. They should not be construed as limiting or restricting this invention to the use of any of the containers or specific conditions mentioned therein, but shall be considered as illustrative.

Example 1

SS Pan Aerial film was exposed and placed in a wooden conditioning chamber (12" x 21" x 24") equipped with a small electric fan. A 4"-Petri dish was charged with 25 ccs. of a mixture consisting of 75% C. P. glacial acetic acid and 25% C. P. formic acid. The cabinet was closed and the fan put in operation. The conditioning with the acid vapor occurred at an average room temperature of 70° F. and an average relative humidity of 50%. After 10 minutes' treatment, the material was developed at 68° F. in a metol hydroquinone developer for 14 minutes. A suitable metol hydroquinone developer is one of the following composition diluted 1:1 (one part developer and one part water).

| | | |
|---|---|---|
| Hot water (125° F.) | cc | 750 |
| Metol | grams | 1.5 |
| Sodium sulfite, anhyd | do | 45 |
| Sodium bisulfite | do | 1 |
| Hydroquinone | do | 3 |
| Sodium carbonate, monohydrated | do | 6 |
| Potassium bromide | do | 0.8 |
| Water to make | liters | 1 |

The effective speed of the film was tripled without appreciable increase in fog in comparison with an untreated film exposed and developed under identical conditions.

Example 2

"Triple S" Pan Portrait film was exposed and treated as above for 20 minutes. The effective speed was doubled in comparison with untreated film exposed and developed under identical conditions.

Example 3

Exposed SS Pan Aerial film was placed for 6 minutes in a solution of commercial benzene containing ¾% by volume of acetic acid and ¼% by volume of formic acid at 72° F. Agitation was provided for 5 seconds every 2 minutes. After removal of the film from this solution and evaporation of the benzene, the film was tank-developed at 68° F. for 15 minutes in a metol X-ray film developer of the following composition:

| | | |
|---|---|---|
| Hot water (125° F.) | cc | 750 |
| Metol | grams | 3.5 |
| Sodium sulfite, anhyd | do | 60 |
| Hydroquinone | do | 9 |
| Sodium carbonate, monohydrated | do | 40 |
| Potassium bromide | do | 2 |
| Water to make | liters | 1 |

The effective speed of the film was tripled in comparison with untreated film exposed and developed under identical conditions.

Example 4

Exposed "Triple S" Pan Aerial film was placed for 32 minutes in a solution of commercial carbontetrachloride, containing ¾% by volume of acetic acid and ¼% by volume of formic acid at 72° F. Agitation was provided for 5 seconds every 4 minutes. The film was developed at 68° F. for 15 minutes in a metol X-ray film developer of the following composition:

| | | |
|---|---|---|
| Hot water (125° F.) | cc | 750 |
| Metol | grams | 3.5 |
| Sodium sulfite, anhyd | do | 60 |
| Hydroquinone | do | 9 |
| Sodium carbonate, monohydrated | do | 40 |
| Potassium bromide | do | 2 |
| Water to make | liters | 1 |

The effective speed after the treatment was 1½ that of an untreated film exposed and developed under identical conditions.

Example 5

SS Pan Aerial film was treated for 10 minutes in a Smith developing machine modified as shown in the drawings discussed above. The apparatus was prepared for the treatment by placing a solution of 2 parts of glacial acetic acid and 8 parts of formic acid on absorbing or blotter paper shown attached to a side wall of the can. The cover fitting over the winding knobs and motor supports was taped tightly over the can top during the treatment. Air was blown into the can to circulate the acid vapors around the film through the rubber inlet tube taped to the blower outlet. This air circulates past the acid-soaked blotter where it becomes saturated with acid vapors. The humidity of the air itself supplies the necessary water content for the vapor mixture. It then circulates around the film as the latter is run from spool to spool and is carried out of the tank or can through the exhaust tube. 15 cc. of the acid mixture was sufficient for this treatment. The reels and film were removed and placed in another tank containing a developer of the following composition:

| | | |
|---|---|---|
| Hot water (125° F.) | cc | 750 |
| Metol | grams | 3.5 |
| Sodium sulfite, anhyd | do | 60 |
| Hydroquinone | do | 9 |
| Sodium carbonate, monohydrated | do | 40 |
| Potassium bromide | do | 2 |
| Water to make | liters | 1 |

Development was carried out in the usual way at 72° F. for 10 to 12 minutes. The effective speed of this film was three times that of untreated film exposed and developed under identical conditions.

The conditions of the vapor treatment may be varied and advantageously adapted according to the specific results desired. The speed of acid vapor intensification of the latent image can also be increased some five times by carrying out the process in vacuo. Also, formic acid reacts on the latent image about five times as rapidly as acetic acid and higher concentrations of either acid permit of shortening the time of the treatment as does also more rapid circulation of the vapor or increase of the temperature above room temperature to approximately 85° to 90° F. The process is not limited to any particular type of emulsion but is applicable to emulsions sensitized for any region of the spectral range, such as ortho, panchromatic and infrared emulsions. Simple experimental tests will establish the optimum treatment for each particular type of film. In general, shorter treatments produce less intensification, but an insufficiently hardened emulsion may soften excessively under a more extended treatment. Also, the acid which the film absorbs in the conditioning chamber continues to react after removing the film from the chamber until it has evaporated or becomes neutralized by the developer. Consequently, if a film has received optimum conditioning in the chamber there should be no delay in the development. Otherwise, over-treatment will result. Conversely, a less than optimum treatment may be corrected by withholding development for a few hours. This same effect permits of submitting the film before exposure to the organic acid vapor treatment and employing the acid absorbed by the film during such treatment for intensification of the latent image after exposure. In following such a procedure as this, it is necessary to give the absorbed acid an opportunity to exert its speed increasing influence upon the latent image after exposure. If development takes place too soon after exposure of a film which has been pretreated with the acid, desensitization invariably occurs since there has been no opportunity for the acid to act on the latent image. Development of a film so treated, therefore, should be delayed for several hours after exposure. Although this alternative procedure is of advantage where it is not possible to condition the already exposed film by treatment with the organic acid vapors, the preferred practice is to submit the photographic material after exposure to the treatment with the acid vapors. In either case it will be apparent that the latent image produced by exposure of the photographic material is acted upon by the acid vapors in the presence of moisture. Similar considerations apply to the treatment of the photographic elements containing latent images in solutions of the organic acids. Thus the film may be treated prior to exposure in a solution of the organic acid in a suitable solvent.

It has been found that the solution methods are more suitable for cut film or short lengths of roll film and, although any solvent which will dissolve the organic acid with at least traces of water is suitable for the solution treatment, methanol and ethenol and such non-polar solvents as benzene and carbontetrachloride have been found most suitable. It is interesting to note that while pre-bathing of an exposed photographic element containing a latent image in dilute aqueous solutions of organic acids such as acetic acid does not produce intensification of the latent image and may lead to desensitizing if the acid concentration increases, nevertheless, pre-bathing in alcohol such as methanol and ethenol containing up to 10% acetic acid or an acetic-formic acid mixture produces a substantial intensification of the latent image. The water content of such an alcohol acid bath preferably should not be more than 1% by volume. Obviously, alcoholic bathing solutions can best be practiced in accordance with the process of this invention where the light-sensitive layer to be treated rests upon a support which is not readily attacked by that type of solvent. In the case of non-polar solvent such as benzene or carbontetrachloride which are not miscible with water in any appreciable proportions the water necessary for the process may be provided by the natural impurities of the solvents. A water content of, for instance, 0.0002% in benzene containing 1% acetic acid will give the intensification of the latent image as described in Example 3. (The percentages given are by volume.) Immersion times for the liquid method treatment range from 5 to 30 minutes for optimum effects. The solvent absorbed by the film during immersion should be removed from the film before development since such solvents as benzene and carbontetrachloride are immiscible with the usual developers. This removal of the solvent after the acid treatment can be effected by evaporation or rinsing in an ethenol bath, care being taken in the latter case to keep the rinsing time short enough not to affect the film base. In all of the liquid methods or immersion treatments, vigorous agitation of the acid solution is desirable and the temperature of the bath can be raised to approximately 85° to 90° F. in order to speed up the action.

As further examples of the results which are obtainable by this process, the following speed increases are typical: "Ansco" Ultra Speed Pan, Supersensitive Pan Aerial and Infrared emulsions can be made 3 to 4 times faster; cine negative "Supreme," "Triple S" Pan and "Triple S" Ortho cut film can be doubled in speed; Finopan and "Fluorapid" film can be made 1½ times as fast when developed in developers conventionally used for those films. In cases where extreme speed and contrast are of primary importance and a slight increase in graininess and fog less essential, the use of more energetic developers, for instance those of the X-ray type, will produce maximum speed. Increases obtained by the acid vapor treatment were evidenced in most cases by an extension of the threshold sensitivity, but gave a material increase of all the densities up to approximately 1.0 or 1.2. At this point the increase became relatively smaller, until at the shoulder region either no increase or a slight decrease of density resulted. Such extension of the toe produced an overall flattening of the gradation, but for miniature camera work where low-density negatives are customary this flattening is not a disadvantage. The flattening of the gradation may also, if desired, be counteracted by a slight extension of the developing time. Figure III of the accompanying drawings, illustrates typical speed increases obtained by the organic acid treatment. In said Figure III, wherein the ordinates represent densities and the abscissae represent the log of exposure, "A" is the density curve for "Ansco" Ultraspeed Pan film which has been exposed and developed in the ordinary manner, "B" is the density curve for the same type of film exposed under the same conditions and treated with acetic acid vapor prior to development in accordance with the method of the present invention. A similar curve is obtained by treating the exposed film with a solution of acetic acid in benzene containing water as an impurity of the solvent.

In contrast to other known methods for intensification of the latent image the increase in sensitivity obtained by the acid vapor treatment of this invention is quite permanent. In fact, if development is somewhat delayed after treatment, the increase in sensitivity progresses for several days, then does not noticeably change for two or three weeks. After four to seven weeks' storage the increase will be reduced only to approximately ½ its original value and the increased sensitivity will not be completely lost until it has been stored for approximately 10 months. The increased sensitivity of films submitted to other known methods of intensification in some instances begins to diminish shortly after the treatment and in most cases has been completely lost in a few weeks' time.

Having thus described our invention, what we claim as new and desire to secure by Letters Patent is:

1. The process of intensifying the latent image of an exposed photographic silver halide emulsion which comprises contacting the exposed emulsions prior to development with a member of the group consisting of organic acid vapors containing at least traces of water and solutions of organic acids in volatile alcohols and volatile non-polar solvents containing up to 1% of water and developing the latent image.

2. The process of intensifying the latent image of an exposed photographic silver halide emulsion which comprises introducing the exposed emulsion prior to development into an atmosphere of organic acid vapors containing at least traces of water vapor, removing it therefrom, and developing the latent image.

3. The process of intensifying the latent image of an exposed photographic silver halide emulsion which comprises immersing the exposed emulsion prior to development in a bath consisting of a solution of an organic acid in a volatile non-polar solvent containing such amounts of water as are miscible with the solvent, removing the emulsion from the bath, evaporating the solvent and developing the latent image.

4. The process of intensifying the latent image of an exposed photographic silver halide emulsion which comprises immersing the exposed emulsion prior to development in a bath consisting of a volatile alcohol solution of an organic acid containing up to 1% of water, removing the emulsion from the bath, evaporating the solvent and developing the latent image.

5. The process of treating an exposed photographic silver halide emulsion containing a latent image which comprises contacting said exposed emulsion prior to development with an organic acid vapor containing at least traces of water vapor for at least 10 minutes at a temperature of from room temperature to 90° F. and developing the latent image.

6. The process of treating an exposed photographic silver halide emulsion containing a latent image which comprises contacting said exposed emulsion with an organic acid vapor containing at least traces of water vapor for from 10 minutes to 1½ hours while circulating the said vapors in contact with the emulsion at a temperature of from room temperature to 90° F. and developing the latent image.

7. The process of claim 6 wherein the organic acid vapor is a mixture of acetic and formic acid vapors.

8. The process of intensifying the latent image of an exposed photographic silver halide emulsion which comprises immersing the exposed emulsion prior to development in a bath consisting of a 1% solution of an organic acid in benzene containing at least traces of water at a temperature of from room temperature to 90° F. and removing the emulsion from the bath, evaporating the benzene and developing the latent image.

9. The process of claim 8 wherein the organic acid is a mixture of acetic and formic acids.

10. The process of intensifying the latent image of an exposed photographic silver halide emulsion which comprises immersing the exposed emulsion prior to development in a bath consisting of a 10% acetic acid methanol solution containing not more than 1% water, removing the emulsion from the bath, evaporating the methanol and developing the latent image.

FRITZ W. HELLMUT MUELLER.
JAMES E. BATES.